US009550913B2

(12) United States Patent
Parekh et al.

(10) Patent No.: US 9,550,913 B2
(45) Date of Patent: *Jan. 24, 2017

(54) COATING COMPOSITION FOR METAL SUBSTRATES

(71) Applicant: Valspar Sourcing, Inc., Minneapolis, MN (US)

(72) Inventors: Girish G. Parekh, Wexford, PA (US); George K. Bartley, III, Burgettstown, PA (US); Greg M. Paulson, Slippery Rock, PA (US); Paul E. Fuchs, Saxonburg, PA (US); Daniel E. Rardon, Pittsburgh, PA (US); Robert M. O'Brien, Monongahela, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 326 days.

This patent is subject to a terminal disclaimer.

(21) Appl. No.: 14/275,377

(22) Filed: May 12, 2014

(65) Prior Publication Data

US 2014/0338290 A1 Nov. 20, 2014

Related U.S. Application Data

(63) Continuation of application No. 13/540,332, filed on Jul. 2, 2012, now Pat. No. 8,765,241, which is a (Continued)

(51) Int. Cl.
| | |
|---|---|
| *C09D 167/00* | (2006.01) |
| *C08G 18/42* | (2006.01) |
| *C08L 33/00* | (2006.01) |
| *C08L 67/00* | (2006.01) |
| *C09D 175/06* | (2006.01) |
| *C09D 167/08* | (2006.01) |
| *B21D 51/26* | (2006.01) |
| *B65B 3/02* | (2006.01) |
| *C08K 5/01* | (2006.01) |
| *C08K 5/05* | (2006.01) |

(Continued)

(52) U.S. Cl.
CPC ............ *C09D 167/00* (2013.01); *B21D 51/26* (2013.01); *B65B 3/027* (2013.01); *C08G 18/4202* (2013.01); *C08G 18/423* (2013.01); *C08G 18/4213* (2013.01); *C08G 18/4288* (2013.01); *C08K 5/01* (2013.01); *C08K 5/05* (2013.01); *C08K 5/06* (2013.01); *C08K 5/11* (2013.01); *C08K 5/3492* (2013.01); *C08L 33/00* (2013.01); *C08L 67/00* (2013.01); *C08L 91/06* (2013.01); *C09D 167/08* (2013.01); *C09D 175/06* (2013.01); *C08G 2390/40* (2013.01); *Y10S 220/906* (2013.01); *Y10S 525/923* (2013.01); *Y10S 525/924* (2013.01); *Y10T 428/1352* (2015.01); *Y10T 428/1355* (2015.01); *Y10T 428/31794* (2015.04)

(58) Field of Classification Search
CPC ... C09D 167/00; C09D 175/06; C09D 167/08; Y10T 428/1355; Y10T 428/1352; Y10T 428/31794; C08G 18/4202; C08G 18/4213; C08G 18/423; C08G 18/4288; C08G 2390/40; C08L 33/00; C08L 67/00; C08L 91/06; Y10S 525/923; Y10S 525/924; Y10S 220/906; C08K 5/01; C08K 5/05; C08K 5/06; C08K 5/11; C08K 5/3492; B65B 3/027; B21D 51/26

See application file for complete search history.

(56) References Cited

U.S. PATENT DOCUMENTS

| | | | |
|---|---|---|---|
| 3,954,899 A | 5/1976 | Chang et al. | |
| 4,356,277 A | 10/1982 | Birkmeyer | |
| 4,864,000 A | 9/1989 | Boston et al. | |
| 5,252,669 A | 10/1993 | Maska et al. | |
| 5,380,816 A | 1/1995 | Sullivan | |

(Continued)

FOREIGN PATENT DOCUMENTS

| | | |
|---|---|---|
| DE | 4010167 C2 | 10/1991 |
| EP | 0964038 A2 | 12/1999 |

(Continued)

OTHER PUBLICATIONS

ASTM Designation: D 3359-02, Standad Test Method for Measuring Adhesion by Tape Test.

(Continued)

*Primary Examiner* — Michael C Miggins

(57) ABSTRACT

The present invention provides novel packaging articles, e.g., food and beverage cans. Preferred cans typically comprise a body portion and an end portion, wherein at least one of the body and end portions are aluminum and are coated on at least one major surface with a coating composition of the present invention. Suitable coating compositions of the present invention comprise: one or more polyester resins, wherein at least one of the polyester resins has a glass transition temperature ("$T_g$") less than about 50° C., and wherein the polyester resin is formed by the reaction of one or more polyacid molecules and one or more polyol molecules; and a crosslinker. Preferred compositions are substantially free of mobile BPA and aromatic glycidyl ether compounds, e.g., BADGE, BFDGE and epoxy novalacs (e.g., NOGE) and more preferred compositions are also substantially free of bound BPA and aromatic glycidyl ether compounds. In more preferred embodiments (e.g., alcoholic beverage cans), the polyol molecules used to make the polyester resin are substantially free of NPG. The present invention also provides a method of making such cans.

20 Claims, No Drawings

Related U.S. Application Data continuation of application No. 13/358,313, filed on Jan. 25, 2012, now Pat. No. 8,231,951, which is a continuation of application No. 10/522,428, filed as application No. PCT/US03/24090 on Aug. 1, 2003, now Pat. No. 8,133,557.

(60) Provisional application No. 60/400,091, filed on Aug. 1, 2002.

(51) Int. Cl.
*C08K 5/06* (2006.01)
*C08K 5/11* (2006.01)
*C08K 5/3492* (2006.01)
*C08L 91/06* (2006.01)

(56) References Cited

U.S. PATENT DOCUMENTS

| | | |
|---|---|---|
| 5,411,810 A | 5/1995 | Hirakouchi et al. |
| 5,700,529 A | 12/1997 | Kobayashi et al. |
| 5,739,215 A | 4/1998 | Westerhof et al. |
| 5,942,285 A | 8/1999 | Schmid et al. |
| 5,994,462 A | 11/1999 | Srinivasan et al. |
| 6,200,683 B1 | 3/2001 | Montague et al. |
| 6,235,102 B1 | 5/2001 | Parekh et al. |
| 6,458,439 B1 | 10/2002 | Jung et al. |
| 6,461,688 B1 | 10/2002 | Seibel et al. |
| 6,472,480 B1 | 10/2002 | Anderson |
| 6,576,343 B2 | 6/2003 | Parekh et al. |
| 6,730,361 B2 | 5/2004 | Parekh et al. |
| 6,916,874 B2 | 7/2005 | Mazza et al. |
| 7,198,849 B2 | 4/2007 | Stapperfenne et al. |
| 7,381,472 B2 | 6/2008 | Brandenburger et al. |
| 2007/0036903 A1 | 2/2007 | Mayr et al. |

FOREIGN PATENT DOCUMENTS

| | | |
|---|---|---|
| EP | 1277814 A | 1/2003 |
| JP | 07278487 A | 10/1995 |
| JP | 08081652 A | 3/1996 |
| JP | 2000290585 A | 10/2000 |
| JP | 2001019876 A | 1/2001 |
| WO | 9847974 A1 | 10/1998 |
| WO | 0055265 A1 | 9/2000 |
| WO | 0055267 A1 | 9/2000 |

OTHER PUBLICATIONS

ASTM Designation: D 5402-93, Standard Practice for Assessing the Solvent Resistance of Organic Coatings Using Solvent Rubs.

Fakirov, et al., On the Relationship between Microhardness and Glass Transition Temperature of Some Amorphous Polymers, Journal of Polymer Science: Part B, vol. 37, pp. 1413-1419.

COATING COMPOSITION FOR METAL SUBSTRATES

CROSS-REFERENCE TO RELATED APPLICATION(S)

This application is a continuation application of U.S. application Ser. No. 13/540,332 filed on Jul. 2, 2012, (now U.S. Pat. No. 8,765,241), which is a continuation application of U.S. application Ser. No. 13/358,313 filed on Jan. 25, 2012, now U.S. Pat. No. 8,231,951, which is a continuation of U.S. application Ser. No. 10/522,428 filed on Oct. 24, 2005, now U.S. Pat. No. 8,133,557, which is a National Stage Entry of International Application No. PCT/US2003/024090 filed on Aug. 1, 2003, which claims the benefit of U.S. Provisional Application No. 60/400,091, filed on Aug. 1, 2002, each of which is incorporated herein by reference in its entirety.

BACKGROUND

A wide variety of coatings have been used to coat the surfaces of two-piece food and beverage cans. These cans are generally coated using "coil coating" operations, i.e., a planar sheet of a suitable substrate (e.g., steel or aluminum metal) is coated with a suitable composition and cured and then the coated substrate is formed into the can end or body. The coating should be capable of high speed application to the substrate and provide the necessary properties when cured to perform in this demanding end use. For example; the coating should be safe for food contact, have excellent adhesion to the substrate, be capable of being drawn during the forming step and providing clean edges (when used as an end coating) when the end is opened. Previous coatings have suffered from one or more deficiencies. For example, many of the current coatings contain mobile or bound bisphenol A ("BPA") or aromatic glycidyl ether compounds or PVC compounds. These compounds are perceived as being potentially harmful to human health. Consequently, there is a strong desire to eliminate these compounds from food contact (e.g., beverage) coatings.

From the foregoing, it will be appreciated that what is needed in the art is a packaging container (e.g., a beverage can) that is coated with a composition that does not contain extractable quantities of such compounds. Such packages, compositions and methods for preparing the same are disclosed and claimed herein.

SUMMARY

In one embodiment, this invention relates to novel packaging articles, e.g., food and beverage cans. Preferred packages of the present invention include "two-piece" cans formed at least in part using aluminum substrate. These preferred cans typically comprise a body portion and an end portion, wherein at least one of the body and end portions are aluminum and are coated on at least one major surface with a coating composition of the present invention. Suitable coating compositions of the present invention comprise: one or more polyester resins, wherein at least one of the polyester resins has a glass transition temperature ("$T_g$") less than about 50° C., and wherein the polyester resin is formed by the reaction of one or more polyacid molecules and one or more polyol molecules; and a crosslinker. Preferred compositions are substantially free of mobile BPA and aromatic glycidyl ether compounds, e.g., BADGE, BFDGE and epoxy novalacs (e.g., NOGE) and more preferred compositions are also substantially free of bound BPA and aromatic glycidyl ether compounds. In more preferred embodiments (e.g., alcoholic beverage cans), the polyol molecules used to make the polyester resin are substantially free of NPG.

The present invention also provides a method of making a can, comprising the steps of: forming a body; forming an end; coating at least one of the end and the body on at least one side with a coating composition of the present invention; filling the body with a liquid; and attaching the end to the body. Notably, this method is preferably accomplished utilizing a coil coating method. In this method a coil of a suitable substrate (e.g., aluminum or steel sheet metal) is first coated with the coating composition of the present invention (on one or both sides), cured (e.g., using a bake process), and then the cured substrate is formed (e.g., by stamping or drawing) into the can end or can body or both. The can end and can body are then sealed together with a food or beverage contained therein.

The present invention also provides novel coating compositions. The coating compositions are well suited for aluminum substrates, though they may be used with other substrates as well. Preferred coating compositions comprise: one or more polyester resins, wherein at least one of the polyester resins has a glass transition temperature ("$T_g$") less than about 50° C.; and a crosslinker. The coating composition is preferably substantially free of mobile BPA and aromatic glycidyl ether compounds and more preferred compositions are also substantially free of bound BPA and aromatic glycidyl ether compounds. In more preferred embodiments, the polyol molecules used to make the polyester resin are substantially free of NPG.

DEFINITIONS

The term "substantially free" of a particular mobile compound means that the compositions of the present invention contain less than 1000 parts per million (ppm) of the recited mobile compound.

The term "essentially free" of a particular mobile compound means that the compositions of the present invention contain less than 100 parts per million (ppm) of the recited mobile compound.

The term "essentially completely free" of a particular mobile compound means that the compositions of the present invention contain less than 5 parts per million (ppm) of the recited mobile compound.

The term "completely free" of a particular mobile compound means that the compositions of the present invention contain less than 20 parts per billion (ppb) of the recited mobile compound.

If the aforementioned phrases are used without the term "mobile" (e.g., "substantially free of XYZ compound") then the compositions of the present invention contain less than the aforementioned amount of the compound whether the compound is mobile in the coating or bound to a constituent of the coating.

The term "mobile" means that the compound can be extracted from the cured coating when a coating (typically ~1 mg/cm$^2$ (6.5 mg/in$^2$) thick) is exposed to a 10 weight percent ethanol solution for two hours at 121° C. followed by exposure for 10 days in the solution at 49° C.

The term "organic group" means a hydrocarbon (i.e., hydrocarbyl) group with optional elements other than carbon and hydrogen in the chain, such as oxygen, nitrogen, sulfur, and silicon that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated linear or branched hydrocarbon group with one or more carbon-carbon double bonds, such as a vinyl group. The term "alkynyl group" means an unsaturated linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mono- or polynuclear aromatic hydrocarbon group. The term "heterocyclic group" means a closed ring hydrocarbon in which one or more of the atoms in the ring is an element other than carbon (e.g., nitrogen, oxygen, sulfur, etc.). Substitution is anticipated on the organic groups of the polyesters used in the coating compositions of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "hydrocarbyl moiety" refers to unsubstituted organic moieties containing only hydrogen and carbon.

DETAILED DESCRIPTION

The present invention provides novel packaging articles, e.g., food and beverage cans. Preferred packages of the present invention include "two-piece" cans formed at least in part using aluminum substrate. These preferred cans typically comprise a body portion and an end portion, wherein at least one of the body and end portions are aluminum and are coated on at least one major surface with a coating composition of the present invention. The present invention also provides novel coating compositions. The coating compositions are well suited for aluminum substrates, though they may be used with other substrates as well. The present invention also provides a method of making a can, comprising the steps of: forming a body; forming an end; coating at least one of the end and the body on at least one side with a coating composition of the present invention; filling the body with a liquid; and attaching the end to the body.

Suitable coating compositions of the present invention comprise: one or more polyester resins and a crosslinker. In preferred embodiments at least one of the polyester resins is a low $T_g$ polyester resin, i.e., resins having a $T_g$ less than about 50° C. Blends of low $T_g$ polyesters with high $T_g$ polyesters (i.e., resins having a $T_g$ greater than about 50° C.) may be used if desired.

Preferred compositions are substantially free of mobile BPA and aromatic glycidyl ether compounds [e.g., BADGE, BFDGE and epoxy novalacs], more preferably essentially free of mobile BPA and aromatic glycidyl ether compounds, even more preferably essentially completely free of mobile BPA and aromatic glycidyl ether compounds, and most preferably completely free of mobile BPA and aromatic glycidyl ether compounds. The coating composition is also more preferably substantially free of bound BPA and aromatic glycidyl ether compounds, most preferably essentially free of bound BPA and aromatic glycidyl ether compounds, and optimally essentially free of bound BPA and aromatic glycidyl ether compounds.

Suitable polyester resins for use in the coatings of the present invention include resins formed by the reaction of one or more polyacid molecules and one or more polyol molecules.

Suitable polyacids include adipic, azelaic, cyclohexane dicarboxylic, fumaric, isophthalic, maleic, phthalic, sebacic, succinic, terephthalic acids and anhydrides and esters thereof, and mixtures thereof. Presently preferred polyacids include: isophthalic, sebacic, and terephthalic acids.

Suitable polyol molecules include ethylene glycol, propylene glycol, butylene glycol, neopentyl glycol ("NPG", though NPG is not preferred in certain embodiments), cyclohexane diol, cyclohexane dimethanol, hexane diol, substituted propane diols (e.g., 2-methyl, 1,3-propane diol), substituted butane diols, substituted pentane diols, substituted hexane diols, diethylene glycol and triols, and mixtures thereof. Presently preferred polyols include: ethylene glycol, cyclohexane dimethanol, and 2-methyl, 1,3-propane diol.

In preferred embodiments (e.g., alcoholic beverage cans), the polyol molecules used to make the polyester resin are substantially free of NPG, more preferably essentially free of NPG, most preferably essentially completely free of NPG, and optimally completely free of NPG.

Preferred low $T_g$ polyester resins have a glass transition temperature less than about 50° C., more preferably less than 25° C., and most preferably between 15 and 25° C.

Preferred compositions comprise between about 60 and 95 weight percent polyester resin (based on solids content of the composition, i.e., not including volatile carriers), and more preferably between about 65 and 85 weight percent.

Blends of low $T_g$ and high $T_g$ polyesters may be used. In one preferred embodiment the blend comprises between about 50 and 100 weight percent low $T_g$ polyester, based on the weight of total polyester, and between about 0 and 50 weight percent high $T_g$ polyester. In a more preferred embodiment the blend comprises between about 60 and 90 weight percent low $T_g$ polyester and between 10 and 40 weight percent high $T_g$ polyester, based on the total weight of the polyester component. Optimally, the blend comprises between about 70 and 90 weight percent low $T_g$ polyester and between 10 and 30 weight percent high $T_g$ polyester, based on the total weight of the polyester component.

Suitable polyesters for use in the present invention have a number average molecular weight (based on end group analysis) of at least 4,000, more preferably at least 5,000, most preferably between 5,000 and 20,000, and optimally between about 5,000 and 12,000 Daltons. To avoid crazing preferred polyesters are typically amorphous.

Preferred polyesters for use in the present invention have an acid number below about 5, more preferably below about 4.5 and most preferably about 4. The acid number (as used in reference to the present compositions) is the number of milligrams of potassium hydroxide required to neutralize one gram of the solid polyacid polymer. The acid number of an anhydride-containing polymer is determined by initially hydrolyzing the anhydride-containing polymer to obtain the corresponding polyacid polymer. The acid number is then determined in the same manner as for a polyacid polymer.

Preferred polyesters for use in the present invention have a hydroxyl number (OH number) below about 20, more preferably below about 15. The hydroxyl number of a hydroxyl-containing polymer of the present invention is determined by: (i) esterifying the polymer with acetic anhydride and pyridine to obtain an esterified polymer and acetic acid; and (ii) then neutralizing the acetic acid with potassium hydroxide. The units are expressed similarly to acid number, i.e., the number of milligrams of potassium hydroxide required to neutralize the acetic acid formed as described above per one gram of hydroxyl-containing polymer.

Included within the aforementioned polyester resins are the polyester-polyurethane resins described in co-pending U.S. patent application Ser. No. 10/365,064 filed 12 Feb. 2003, the disclosure of which is herein incorporated by reference.

In accordance with the present invention, the coating composition further comprises a crosslinking resin. Any of the well known hydroxyl-reactive curing resins can be used. Phenoplast and aminoplast curing agents are preferred. Typically, the crosslinker is an aminoplast resin. Aminoplast resins are the condensation products of aldehydes such as formaldehyde, acetaldehyde, crotonaldehyde, and benzaldehyde with amino or amido group-containing substances such as urea, melamine and benzoguanamine. Useful alcohols include the monohydric alcohols such as methanol, ethanol, propanol, butanol, hexanol, benzyl alcohol, cyclohexanol, and ethoxyethanol.

Examples of suitable crosslinking resins include, without limitation: benzoguanamine-formaldehyde resins, melamine-formaldehyde resins, and urea-formaldehyde resins. Preferably, the crosslinker employed when practicing this invention comprises a benzoguanamine-formaldehyde resin. One specific example of a particularly useful crosslinker is the fully alkylated benzoguanamine-formaldehyde resin commercially available from Cytec Industries, Inc. under the trade name of CYMEL 1123.

Urea-formaldehyde and esterified melamine-formaldehyde curing agents may be used. Phenoplast resins include the condensation products of aldehydes with phenol. Formaldehyde and acetaldehyde are preferred aldehydes. Various phenols can be employed such as phenol, cresol, p-phenylphenol, p-tert-butylphenol, p-tert-amylphenol, and cyclopentylphenol.

As examples of other generally suitable curing agents are the blocked or non-blocked aliphatic, cycloaliphatic or aromatic di-, tri- or polyvalent isocyanates such as hexamethylene diisocyanate, cyclohexyl-1,4-diisocyanate and the like.

The level of curing agent required will depend on the type of curing agent, the time and temperature of the bake, and the molecular weight of the polymer. The crosslinker is typically present in an amount ranging from between about 5 to 40% by weight. Preferably, the crosslinker is present in an amount ranging from between 10 to 30% by weight; and more preferably, from between 15 to 25% by weight. These weight percentages are based upon the total weight of the resin solids in the coating composition.

If desired, the coating composition may optionally comprise one or more acrylate copolymers having pendant glycidyl groups. Suitable such acrylic copolymers are described in U.S. Pat. No. 6,235,102, which is herein incorporated by reference. The optional acrylic resin is typically present in an amount ranging from between about 0 to 20% by weight. Preferably, the acrylic resin is present in an amount ranging from between 0 to 15% by weight; more preferably, from between 2 to 10% by weight; and optimally, from between 6 to 10% by weight. These weight percentages are based upon the total weight of the resin solids in the coating composition.

Suitable acrylate copolymers having pendant glycidyl groups that are useful in the present invention preferably contain about 30 to 80 weight %, more preferably about 40 to 70 weight %, and most preferably about 50 to 70 weight % of a monomer containing a glycidyl group, for example, glycidyl methacrylate.

Suitable monomers containing a glycidyl group include any monomer having a carbon-carbon double bond and a glycidyl group. Typically, the monomer is a glycidyl ester of an alpha, beta-unsaturated acid, or anhydride thereof. Suitable alpha, beta-unsaturated acids include monocarboxylic acids or dicarboxylic acids. Examples of such carboxylic acids include, but are not limited to, acrylic acid, methacrylic acid, alpha-chloroacrylic acid, alpha-cyanoacrylic acid, beta-methylacrylic acid (crotonic acid), alpha-phenylacrylic acid, beta-acryloxypropionic acid, sorbic acid, alpha-chlorosorbic acid, angelic acid, cinnamic acid, p-chlorocinnamic acid, beta-stearylacrylic acid, itaconic acid, citraconic acid, mesaconic acid, glutaconic acid, aconitic acid, maleic acid, fumaric acid, tricarboxyethylene, maleic anhydride, and mixtures thereof. Specific examples of monomers containing a glycidyl group are glycidyl(meth)acrylate (i.e., glycidyl methacrylate and glycidyl acrylate), mono- and di-glycidyl itaconate, mono- and di-glycidyl maleate, and mono- and di-glycidyl formate. It also is envisioned that allyl glycidyl ether and vinyl glycidyl ether can be used as the monomer.

It also should be pointed out that the acrylate copolymer can initially be a copolymer of an alpha, beta-unsaturated acid and an alkyl(meth)acrylate, which then is reacted with a glycidyl halide or tosylate, e.g., glycidyl chloride, to position pendant glycidyl groups on the acrylate copolymer. The alpha, beta-unsaturated carboxylic acid can be an acid listed above, for example.

In an alternative embodiment, an acrylate copolymer having pendant hydroxyl groups first is formed. The acrylate copolymer having pendant hydroxyl groups can be prepared by incorporating a monomer like 2-hydroxyethyl methacrylate or 3-hydroxypropyl methacrylate into the acrylate copolymer. The copolymer then is reacted to position pendant glycidyl groups on the acrylate polymer.

A preferred monomer containing a glycidyl group is glycidyl(meth)acrylate.

The acrylic copolymer may optionally comprise an alkyl (meth)acrylate having the structure: $CH_2=C(R^1)-CO-OR^2$ wherein $R^1$ is hydrogen or methyl, and $R^2$ is an alkyl group containing one to sixteen carbon atoms. The $R^2$ group can be substituted with one or more, and typically one to three, moieties such as hydroxy, halo, amino, phenyl, and alkoxy, for example. Suitable alkyl(meth)acrylates for use in the copolymer therefore encompass hydroxy alkyl(meth) acrylates and aminoalkyl(meth)acrylates. The alkyl(meth) acrylate typically is an ester of acrylic or methacrylic acid. Preferably, $R^1$ is methyl and $R^2$ is an alkyl group having two to eight carbon atoms. Most preferably, $R^1$ is methyl and $R^2$ is an alkyl group having two to four carbon atoms. Examples of the alkyl(meth)acrylate include, but are not limited to, methyl, ethyl, propyl, isopropyl, butyl, isobutyl, pentyl, isoamyl, hexyl, 2-aminoethyl, 2-hydroxyethyl, 2-ethylhexyl, cyclohexyl, decyl, isodecyl, benzyl, 2-hydroxypropyl, lauryl, isobornyl, octyl, and nonyl(meth)acrylates.

The acrylic copolymer preferably comprises selected from the group consisting of: vinyl monomers, like styrene, halostyrene, isoprene, diallylphthalate, divinylbenzene, conjugated butadiene, alpha-methylstyrene, vinyl toluene, vinyl naphthalene, and mixtures thereof. Other suitable polymerizable vinyl monomers include acrylonitrile, acrylamide, methacrylamide, methacrylonitrile, vinyl acetate, vinyl propionate, vinyl butyrate, vinyl stearate, isobutoxymethyl acrylamide, and the like.

The aforementioned monomers may be polymerized by standard free radical polymerization techniques, e.g., using initiators such as peroxides or peroxy esters, to provide a copolymer having a number average molecular weight (Mn) of about 2,000 to 15,000, preferably about 2,500 to 10,000, and most preferably about 3,000 to 8,000.

The coating composition of the present invention may also include other optional ingredients that do not adversely affect the coating composition or a cured coating composition resulting therefrom. Such optional ingredients are typically included in a coating composition to enhance composition aesthetics, to facilitate manufacturing, processing, handling, and application of the composition, and to further improve a particular functional property of a coating composition or a cured coating composition resulting therefrom.

Such optional ingredients include, for example, catalysts, dyes, pigments, toners, extenders, fillers, lubricants, anticorrosion agents, flow control agents, thixotropic agents, dispersing agents, antioxidants, adhesion promoters, light stabilizers, and mixtures thereof. Each optional ingredient is included in a sufficient amount to serve its intended purpose, but not in such an amount to adversely affect a coating composition or a cured coating composition resulting therefrom.

One optional ingredient is a catalyst to increase the rate of cure. The catalyst is preferably present in an amount of 0 to about 1%, more preferably about 0.05 to about 1%, and most preferably about 0.1 to 0.5% by weight of nonvolatile material. Examples of catalysts, include, but are not limited to, strong acids (e.g., dodecylbenzene sulphonic acid (ddbsa, available as CYCAT 600), msa, ptsa, dnndsa, and triflic acid), quaternary ammonium compounds, phosphorous compounds, and tin and zinc compounds, like a tetraalkyl ammonium halide, a tetraalkyl or tetraaryl phosphonium iodide or acetate, tin octoate, zinc octoate, triphenylphosphine, and similar catalysts known to persons skilled in the art.

Another useful optional ingredient is a lubricant, like a wax, which facilitates manufacture of metal closures by imparting lubricity to sheets of coated metal substrate. A lubricant is preferably present in the coating composition in an amount of 0 to about 2%, and preferably about 0.1 to about 2%, by weight of nonvolatile material. Preferred lubricants include, for example, Carnauba wax and polyethylene type lubricants.

Another useful optional ingredient is a pigment, like titanium dioxide. A pigment, like titanium dioxide, is optionally present in the coating composition in an amount of 0 to about 50%.

In one embodiment, the coating composition is a liquid composition, wherein the resins, crosslinker and other optional ingredients, are dispersed in a carrier, preferably a nonaqueous carrier. In general, the carrier has sufficient volatility to evaporate essentially entirely from the coating composition during the curing process, such as during heating at about 220 to 260° C. for about 10 to 30 seconds.

Suitable nonaqueous carriers are known in the art of coating compositions, and include, for example, but are not limited to, glycol ethers, like ethylene glycol monomethyl ether, ethylene glycol monoethyl ether, ethylene glycol monobutyl ether, and propylene glycol monomethyl ether; ketones, like cyclohexanone, ethyl aryl ketones, methyl aryl ketones, and methyl isoamyl ketone; aromatic hydrocarbons, like aromatic 100, butyl cellosolve, toluene, benzene, and xylene; aliphatic hydrocarbons, like mineral spirits, kerosene, and naphtha; alcohols, like isopropyl alcohol, n-butyl alcohol, and ethyl alcohol; and aprotic solvents, like tetrahydrofuran; chlorinated solvents; esters (e.g., dibasic ester); glycol ether esters, like propylene glycol monomethyl ether acetate; and mixtures thereof. It should be understood that the present coating composition can include water (though this is not preferred), preferably at most a relatively low amount of water, such as up to about 5% by total weight of the composition. The water can be added to the composition intentionally, or can be present in the composition inadvertently, such as when water is present in a particular component included in the coating composition.

The amount of carrier included in the composition is limited only by the desired, or necessary, rheological properties of the composition. Usually, a sufficient amount of carrier is included in the coating composition to provide a composition that can be processed easily and that can be applied to a metal substrate easily and uniformly, and that is sufficiently removed from the coating composition during curing within the desired cure time. Preferred coating compositions have between 10 to 50% solids, more preferably between 20 to 40% solids.

The aforementioned coating composition is particularly well adapted for use as a coating for two-piece cans. Two-piece cans are manufactured by joining a can body (typically a drawn metal body) with a can end (typically a drawn metal end). The coatings of the present invention are suitable for use in food contact situations and may be used on the inside of such cans. The coatings are also suited for use on the exterior of the cans. Notably, the present coatings are well adapted for use in a coil coating operation. In this operation a coil of a suitable substrate (e.g., aluminum or steel sheet metal) is first coated with the coating composition of the present invention (on one or both sides), cured (e.g., using a bake process), and then the cured substrate is formed (e.g., by stamping or drawing) into the can end or can body or both. The can end and can body are then sealed together with a food or beverage contained therein.

The following examples are offered to aid in understanding of the present invention and are not to be construed as limiting the scope thereof. Unless otherwise indicated, all parts and percentages are by weight.

The constructions cited were evaluated by tests as follows:

Adhesion

Adhesion testing was performed to assess whether the coating adheres to the coated substrate. The adhesion test was performed according to ASTM D 3359—Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remained adhered, a rating of "8" indicates 80% of the coating remained adhered, etc.

Solvent Resistance

The cure of a coating is measured as a resistance to solvents, such as Methyl Ethyl Ketone (MEK) or Acetone. This test was performed as described in ASTM D 5402-93. The number of double-rubs (i.e. one back-and forth motion) is reported.

Blush Resistance

Blush resistance measures the ability of a coating to resist attack by various solutions. Typically, blush is measured by the amount of water absorbed into a coated film. When the film absorbs water, it generally becomes cloudy or looks white. Blush is generally measured visually using a scale from 0 to 10 where a rating of "10" indicates no blush and a rating of "0" indicates complete whitening of the film.

Sterilization or Pasteurization

The sterilization or pasteurization test determines how a coating withstands the processing conditions for different types of food products packaged in a container. Typically, a coated substrate is immersed in a water bath and heated for 5-60 minutes at temperatures ranging from 65 to 100° C. For the present evaluation, the coated substrate was immersed in a deionized water bath for 45 minutes at 85° C. The coated substrate was then removed from the water bath and tested for coating adhesion and blush as described above.

Process or Retort Resistance

This is a measure of the decomposition of the coated substrate after exposure to heat and pressure. The procedure is similar to the Sterilization or Pasteurization test. Testing is accomplished by subjecting the substrate to heat ranging from 105 to 130° C. and pressure ranging from 0.7 to 1.05 kg/cm$^2$ for a period of 15 to 90 minutes. For the present evaluation, the coated substrate was immersed in deionized water and subjected to heat of 121° C. and pressure of 1.05 kg/cm$^2$ for a period of 90 minutes. The coated substrate was then tested for adhesion and blush as described above.

Fabrication

This test measures the ability of a coated substrate to retain its integrity as it undergoes the formation process necessary to produce a beverage can end. It is a measure of the presence or absence of cracks or fractures in the formed end. The end is typically placed on a cup filled with an electrolyte solution. The cup is inverted to expose the surface of the end to the electrolyte solution. The amount of electrical current that passes through the end is then measured. If the coating remains intact (no cracks or fractures) after fabrication, minimal current will pass through the end.

For the present evaluation, fully converted 202 standard opening beverage ends were exposed for a period of 4 seconds to an electrolyte solution comprised of 1% NaCl by weight in deionized water. Metal exposure was measured using a WACO Enamel Rater II, available from the Wilkens-Anderson Company, Chicago, Ill., with an output voltage of 6.3 volts. The measured electrical current, in milliamps, is reported.

Preferred coatings of the present invention pass less than 10 milliamps when tested as described above, more preferably less than 5 ma, most preferably less than 1 ma, and optimally less than 0.5 ma.

Copper Chloride Resistance

This test is also used to measure the ability of a coated substrate to retain its integrity as it undergoes the formation process necessary to produce a beverage can end. In this test, a fabricated can end is exposed to a copper chloride solution for a period of 24 hours. Copper will deposit in any cracks or fractures that may exist in the end. This test is more discriminating than the fabrication test described above.

After fabrication, can ends are placed on a flat surface with the coated side of the end facing upwards. The end is then filled with a 2% (by weight) solution of CuCl (II)-2 H$_2$O in deionized water. After 24 hours, the solution is removed from the end and the end is visually rated for copper deposits.

Crazing—Reverse Impact Resistance

The reverse impact measures the coated substrates ability to withstand the deformation encountered when impacted by a steel punch with a hemispherical head. For the present evaluation, coated substrate was subjected to 12 in-lbs (1.36 N m) of force using BYK-Gardner "Coverall" Bend and Impact Tester and rated visually for micro-cracking or micro-fracturing—commonly referred to as crazing. Test pieces were impacted on the uncoated or reverse side.

T-Bend Test

This is another method used to measure the flexibility characteristics of a coating. In this test a small sample of coated substrate, typically 5 cm×5 cm, is bent at an angle of 180 degrees using a 3 mm diameter cylindrical mandrel. After bending, the coated side of the test piece is facing outwards.

Using uncoated substrate of the same type and thickness as the test piece, spacers are placed in the fold of the test piece. 0T bend has no spacer, 1T bend has one spacer, 2T bend has two spacers, etc. The test piece, with spacers, is placed between two 7.5×12.5 cm steel plates. The steel plates are then impacted essentially flattening the bend area. After removing the test piece from the steel plates, the degree of cracking or fracturing in the bend is determined by exposing the bend to an electrolyte solution and measuring the electrical current as described above under Fabrication.

For the present evaluation, a 1T bend test was employed. Test pieces were subjected to a force of 40 in-lbs. The measured electrical current through the bend is reported in milliamps.

Feathering

Feathering is a term used to describe the adhesion loss of a coating on the tab of a beverage can end. When a beverage can is opened, a film will be present across the opening of the can should a coating lose adhesion on the tab. This is feathering.

To test feathering, a 10 cm×15 cm coated panel is used. With the coated side of the panel facing downwards, an inverted V is scribed into the substrate using a standard utility knife or razor blade. The V is scribed at the midpoint along one the edges of the test panel in a direction perpendicular to the grain of the substrate. The point of the V is 2.5 cm from the edge of the test piece. The sides of the V extend to the edge of the test piece. The opening or top of the V is 4 cm wide at this edge. The depth of the score lines should be 75% of the thickness of the test piece. Starting at the edge of the test panel, metal shears are then used to make a 10 mm cut along each scribe line. The test piece is then pasteurized as described under Pasteurization above.

After pasteurization, pliers are used to bend the cut "tab" to a 90 degree angle away from the coated side of the substrate. The test piece is then placed on a flat surface, coated side down. The cut "tab" is gripped using pliers and the "tab" is pulled from the test panel at an angle of 180 degrees until it is completely removed. After removing the "tab", any coating that extends into the opening on the test panel is measured. The distance of the greatest penetration (feathering) is reported in millimeters.

EXAMPLES

Example 1

Run 1

Preparation of Low $T_g$ Polyester

In a suitably equipped 4-neck flask with stirrer, thermometer, packed column, water condenser, Dean Stark trap, and Nitrogen inlet was charged 127 grams (1.41 moles) of 2-methyl 1,3-propane diol, 22.3 grams (0.36 moles) of Ethylene glycol, 133.6 grams (0.804 moles) of Terephthalic acid, and 0.45 grams of 1-cholor-3-hydroxy-1,1,3,3-tetrabutoxy distannoxane (CHTD) catalyst. The batch was heated to 220° C., while continuously maintaining the head temperature above the packed column at below 100° C. The water condensate was collected in a Dean Stark trap. After the liquid contents in the batch became clear, the batch was cooled to 180° C., and 97.9 grams (0.486 moles) of Sebacic acid and 69.3 grams (0.417 moles) of Isophthalic acid were added. The batch was then heated to 220° C., water condensate collected in a Dean Stark trap. 25 grams of Cyclohexanone was added to the batch. 50 grams of Aromatic 150 was then added and the temperature was heated to 234° C. The reaction was then cooled and another 300 grams of Aromatic 150 added. The resultant polyester had non-volatile matter (NVM) of 49.6%, Acid No. of 3.3, OH No. of 14, Mw of 24,780, Mn of 8,740, Mw/Mn of 2.8, and $T_g$ of 5.9° C.

Run 2

Preparation of Low $T_g$ Polyester

In a suitably equipped 4-neck flask with stirrer, thermometer, packed column, water condenser, Dean Stark trap, and Nitrogen inlet was charged 128.7 grams (1.43 moles) of 2-methyl 1,3-propane diol, 22.3 grams (0.36 moles) of Ethylene glycol, 148.5 grams (0.894 moles) of Terephthalic acid, and 0.45 grams of CHTD catalyst. The batch was heated to 220° C., while continuously maintaining the head temperature above the packed column below 100° C. The water condensate was collected in a Dean Stark trap. After the liquid contents in the batch became clear, the batch was cooled to 180° C., and 75.2 grams (0.372 moles) of Sebacic acid and 76.8 grams (0.462 moles) of Isophthalic acid were added. The batch was then heated to 220° C., water condensate collected in a Dean Stark trap. 25 grams of Cyclohexanone was added to the batch. 50 grams of Aromatic 150 was then added and the temperature was heated to 234° C. The reaction was then cooled and another 300 grams of Aromatic 150 added. The resultant polyester had NVM of 52.6%, Acid No. of 2.7, OH No. of 10, Mw of 12,890, Mn of 4,780, Mw/Mn of 2.7, and $T_g$ of 13.5° C.

Run 3

Preparation of Low $T_g$ Polyester

This run was prepared similar to Example 1, Run 2 above except that 225.3 grams (1.36 moles) of Terephthalic acid was used instead of the combination of terepphthalic acid and Isophthalic acid. The resultant polyester had NVM of 52.7%, Acid No. of 4.6, OH No. of 7, Mw of 23,667, Mn of 5,797, Mw/Mn of 4.1, and $T_g$ of 15.9° C.

Run 4

Preparation of Low $T_g$ Polyester

This run was similar to Example 1, Run 1, except that the catalyst used was Butyl Stannoic Acid instead of CHTD. The resultant polyester had NVM of 52.6%, Acid No. of 3.0, OH No. of 17, Mw of 24,270, Mn of 7,032, Mw/Mn of 3.45, and $T_g$ of 5.8° C.

Run 5

Preparation of Low $T_g$ Polyester

In a suitably equipped 4-neck flask with stirrer, thermometer, packed column, water condenser, Dean Stark trap, and Nitrogen inlet was charged 127 grams (1.41 moles) of 2-methyl 1,3-propane diol, 22.3 grams (0.36 moles) of Ethylene glycol, 262.5 grams (1.58 moles) of Terephthalic acid, and 0.45 grams of Butyl Stannoic acid catalyst. The batch was heated to 220° C., while continuously maintaining the head temperature above the packed column below 100° C. The water condensate was collected in a Dean Stark trap. After the liquid contents in the batch became clear, the batch was cooled to 180° C., and 69.3 grams (0.12 moles) of (Dimer Fatty acid) Empol 1008, and 69.3 grams (0.417 moles) of Isophthalic acid were added. The batch was then heated to 220° C., water condensate collected in the Dean Stark trap. 25 grams of Cyclohexanone was added to the batch. 50 grams of Aromatic 150 was then added and the temperature was heated to 234° C. The reaction was then cooled and another 300 grams of Aromatic 150 added. The resultant polyester had NVM of 52.9%, Acid No. of 2, OH No. of 7, Mw of 21,770, Mn of 9,450, Mw/Mn of 2.3, and $T_g$ of 26.6° C.

Run 6

Preparation of Low $T_g$ Polyester

In a suitably equipped 4-neck flask with stirrer, thermometer, packed column, water condenser, Dean Stark trap, and Nitrogen inlet was charged 128.7 grams (1.43 moles) of 2-methyl 1,3-propane diol, 21.1 grams (0.34 moles) of Ethylene glycol, 225.3 grams (1.36 moles) of Terephthalic acid, and 0.45 grams of CHTD catalyst. The batch was heated to 220° C., while continuously maintaining the head temperature above the packed column below 100° C. The water condensate was collected in a Dean Stark trap. After the liquid contents in the batch became clear, the batch was cooled to 180° C., and 75.3 grams (0.372 moles) of Sebacic acid and 76.8 grams (0.417 moles) of Isophthalic acid were added. The batch was then heated to 220° C., water condensate collected in a Dean Stark trap. 25 grams of Cyclohexanone was added to the batch. 50 grams of Aromatic 150 was then added and the temperature was heated to 234° C. The reaction was then cooled and another 300 grams of Aromatic 150 added. The resultant polyester had NVM of 53.2%, Acid No. of 2.5, OH No. of 4, Mw of 30,020, Mn of 11,670, and Mw/Mn of 2.6.

Run 7

Preparation of Low $T_g$ Polyester

This run was similar to Example 1, Run 3, except that the catalyst used was Butyl Stannoic acid instead of CHTD. The resultant polyester had NVM of 49.9%, Acid No. of 3.6, OH No. of 16, Mw of 30,550, Mn of 5,560, and Mw/Mn of 5.5.

Run 8

Preparation of Low $T_g$ Polyester

This run was similar to Example 1, Run 3, except that the product was reduced using Cyclohexanone instead of Aromatic 150. The resultant polyester had NVM of 52.0%, Acid No. of 5.6, OH No. of 11, Mw of 19,720, Mn of 5,150, and Mw/Mn of 3.8.

Run 9

Preparation of Low $T_g$ Polyester

This run was similar to Example 1, Run 3 except for the following: 180.2 grams (1.085 moles) of Terephthalic acid and 45.15 grams (0.27 moles) of Isophthalic acid; and 0.45 grams of Butyl Stannoic acid catalyst instead of CHTD were used. The resultant polyester had NVM of 50.0%, Acid No. of 1.7, OH No. of 18, Mw of 18,070, Mn of 9,830, Mw/Mn of 1.8, and $T_g$ of 13.4° C.

Run 10

Preparation of Low $T_g$ Polyester

This example is similar to example 1, run 3 except that 10% of Terephthalic acid was replaced with Isophthalic Acid. The catalyst was Butyl Stannoic Acid. The batch was reduced with Xylene/DBE=2/1 to 50% solids. The final product composition was —NVM=50.8%, Acid No.=2.2, OH No.=12, $T_g$=15.3 C, Mw=20,290, Mn=4,900, and Mw/Mn=4.14.

Example 2

Preparation of High $T_g$ Polyester

In a suitably equipped 4-neck flask with stirrer, thermometer, packed column, Dean Stark trap, water condenser, and Nitrogen inlet was charged 203.8 grams (1.05 moles) of Dimethyl Terephthalate, 167.1 grams (0.86 moles) of Dimethyl Isophthalate, 67.8 grams (0.73 moles) of 2-methyl 1,3-propane diol, 158.5 grams (2.55 moles) of Ethylene glycol, 77.9 grams (0.54 moles) of 1-4, Cyclohexane Dimethanol (CHDM), and 0.2 grams of CHTD catalyst. The batch was heated to 224° C., while continuously maintaining the head temperature above the packed column below 65° C., and 122 grams of methanol was collected in the Dean Stark trap. 48 grams of Aromatic 150 was then added to the batch.

After removing the packed column, the batch was heated to 228° C., collecting the azeotrope mixture (head temperature—154° C.) of the glycol (mostly ethylene glycol) and Aromatic 150. The bottom layer (glycol) was collected from the Dean Stark trap. After 6 hours an additional 50 grams of Aromatic 150 was added. The batch temperature was slowly raised to 238° C., and the bottom layer was collected. One hundred and six grams of the bottom layer were collected. After addition of another 100 grams of Aromatic 150, the azeotrope process was repeated to 238° C. until there was no glycol distilling over. The batch weight at this stage was 638 grams, and NVM of ~69%. This was reduced to 56% solids by addition of 100 grams of Aromatic 150 to reduce the NVM to 56%. The resultant resin had very high viscosity. Seven hundred sixteen grams of this resin was diluted with 82 grams of Cyclohexanone to 51%.

The resultant polyester had NVM of 51%, Acid No. of <1, OH No. of 23, Mw of 22,770, Mn of 6,270, Mw/Mn of 3.6, and $T_g$ of 61.6° C.

Example 3

Preparation of High $T_g$ Polyester

In a suitably equipped 4-neck flask with stirrer, thermometer, packed column, Dean Stark trap, water condenser, and Nitrogen inlet was charged 295.6 grams (3.28 moles) of 2-methyl 1,3-propane diol, 186.2 grams (3 moles) of Ethylene glycol, 346.54 grams (4.81 moles) of 1-4, Cyclohexane Dimethanol (CHDM), 636.3 grams (7.66 moles) of Terephthalic acid. The batch was heated to 120° C., and 2.2 grams of Butyl Stannoic acid was added. The batch was heated slowly to 224° C., while continuously maintaining the head temperature above the packed column below 100° C., and distilling off the water formed. After the batch appeared clear, 775.87 grams (4.7 moles) of Isophthalic acid was added. The temperature of the batch was maintained at 220° C. while distilling off the water formed. The batch was then cooled to 170° C. and 100 grams of Cyclohexanone was added. The temperature was then raised to 220° C. while removing the water formed. The packed column was then removed and the temperature raised to 232° C. 800 grams of Aromatic 200 was then added. The resultant polyester had NVM of 53%, Acid No. of 2.7, OH No. of 2, Mw of 30,590, Mn of 11,500, Mw/Mn of 2.7, and $T_g$ of 66.2° C.

Example 4

Preparation of Low $T_g$ Polyester-Polyurethane

Run 1

Preparation of Polyester Intermediate

In a suitably equipped 4-neck flask with stirrer, thermometer, packed column, Dean Stark trap, water condenser, and Nitrogen inlet was charged 135 grams (1.5 moles) of 2-methyl 1,3-propane diol, 22.3 grams (0.36 moles) of Ethylene glycol, 180.3 grams (1.086 moles) of Terephthalic acid. The batch was heated to 120° C., and 0.45 grams of Butyl Stannoic acid was added. The batch was heated slowly to 220° C., while continuously maintaining the head temperature above the packed column below 100° C., and distilling off the water formed. After the batch appeared clear, 45.2 grams (0.27 moles) of Isophthalic acid, and 75.2 grams (0.37) of Sebacic acid were added. The temperature of the batch was maintained at 220° C. while distilling off the water formed. The batch was then cooled to 170° C. and 25 grams of Cyclohexanone was added. The temperature was then raised to 220° C. while removing the water formed. The packed column was then removed and the temperature raised to 232° C. 337 grams of Aromatic 150 was then added. The resultant polyester had NVM of 48.6%, Acid No. of 2.0, OH No. of 37, Mw of 9,790, Mn of 3,100, Mw/Mn of 3.2, and $T_g$ of 10.6° C.

Run 2

Preparation of Polyester-Polyurethane

In a suitably equipped 4-neck flask with stirrer, thermometer, water condenser, and Nitrogen inlet was charged 200 grams of the polyester intermediate prepared in Run 1 above, 7.2 grams of Isophorone Diisocyanate, and 0.2 grams of Dibutylin Dilaurate. The batch was heated to and maintained at 75° C. under Nitrogen blanket for 6 hours. 55 grams of Aromatic 150 was then added. The resultant polyester-polyurethane has 39.8% solids, Mw of 59,460, Mn of 7,800, Mw/Mn of 7.6, and $T_g$ of 28.3° C.

Example 5

Preparation of High $T_g$ Polyester-Polyurethane

Run 1: Preparation of Polyester Intermediate

In a suitably equipped 4-neck flask with stirrer, thermometer, packed column, Dean Stark trap, water condenser, and Nitrogen inlet was charged 634.8 grams (3.27 moles) of Dimethyl Terephthalate, 520.6 grams (2.68 moles) of Dimethyl Isophthalate, 204.9 grams (2.27 moles) of 2-methyl 1,3-propane diol, 493.7 grams (7.95 moles) of Ethylene glycol, 242.6 grams (1.68 moles) of Cyclohexane Dimethanol, and 0.35 grams of Tyzor TOT catalyst. The batch was heated under Nitrogen blanket to 220° C., while continuously maintaining the head temperature above the packed column below 64° C., and distilling off the methanol formed. After 352 grams of methanol was collected, the batch was cooled to 170° C. The packed column was then removed. After the batch appeared clear, 45.2 grams (0.27 moles) of Isophthalic acid, and 75.2 grams (0.37 moles) of Sebacic acid were added. The temperature of the batch was maintained at 220° C. while distilling off the water formed. The batch was then cooled to 170° C. and 25 grams of Cyclohexanone was added. The temperature was then raised to 220° C. while removing the water formed. The packed column was then removed and the temperature raised under vacuum to 232° C. at 5 mm of mercury. 370 grams of the polyol condensate was then collected. The batch was then cooled and isolated as 100 percent solids. The resultant polyester had OH No. of 25, Mw of 10,960, Mn of 4,140, Mw/Mn of 2.6, and $T_g$ of 59.2° C.

Run 2

Preparation of Polyester-Polyurethane

In a suitably equipped 4-neck flask with stirrer, thermometer, water condenser, and Nitrogen inlet was charged 320 grams of the polyester intermediate prepared in Run 1 above, 96 grams of Dibutyl Ester (DBE), 96 grams of Dowanol PM Acetate, 96 grams of Solvesso 100, 96 grams of Solvesso 150, and 96 grams of Butyl Cellosolve Acetate. The batch was heated to 100° C. until a clear homogenous solution was obtained. The clear solution was cooled to 70° C., then 15.8 grams of Isophorone Diisocyanate, and 0.32 grams of Dibutylin Dilaurate catalyst were added. The batch was maintained at 70° C. under Nitrogen blanket for 6 hours, after which period the absence of –NCO was confirmed using FTIR. The batch was cooled and discharged from the flask. The resultant polyester-polyurethane has 36.3% solids, Mw of 31,050, Mn of 10,340, Mw/Mn of 3.0, OH No. of 1, and $T_g$ of 72° C.

Example 6

Preparation of Low $T_g$/High $T_g$ Polyester-Polyurethane Hybrid

In a suitably equipped 4-neck flask with stirrer, thermometer, water condenser, and Nitrogen inlet was charged 97 grams of the Polyester Intermediate of Example 4, Run 1 (OH No.=25); and 200 grams of the Polyester Intermediate of Example 5, Run 1 (OH No.=37). The polyester mixture was dissolved with Aromatic 150 until 40% solids was obtained. The polyester mixture was heated to 75° C., then 12 grams of Isophorone Diisocyanate and 0.2 grams of Dibutylin Dilaurate catalyst were added. The temperature of the batch was maintained at 75° C. for 6 hours. Aromatic 150 was then added to reduce the product to 35% solids. The batch was cooled and discharged from the flask. The resultant polyester-polyurethane has 35% solids, Mw of 156,960, Mn of 27,400, and Mw/Mn of 5.7.

Example 7

Preparation of Low $T_g$/High $T_g$ Polyester-Polyurethane Hybrid

In a suitably equipped 4-neck flask with stirrer, thermometer, water condenser, packed column, Dean Stark trap, and Nitrogen inlet was charged 93.9 grams of 2-methyl 1,3-propane diol (MP Diol), 29.8 grams of Ethylene Glycol, 34.7 grams of Cyclohexane Dimethanol (CHDM), and 176.3 grams of Terephthalic acid. The batch was heated to 120° C., and 0.45 grams of Butyl Stannoic acid was added. The process used was similar to that of Example 3 above. After the batch became clear, 77.6 grams of Isophthalic acid, and 38 grams of Sebacic acid were added. The product was reduced with Cyclohexanone. The resultant polyester-polyurethane has NVM of 47.5%, Acid No. of 2.2, Mw of 20,950, Mn of 4,680, Mw/Mn of 4.5, OH No. of 10, and $T_g$ of 38.7° C.

Example 8

Samples A-K

Preparation of Coating Compositions

Sample A is a clear interior beverage end lining comprising the following: 76.101% Toyobo Vylon GK-330 polyester resin dissolved at 28.4% in 50/30/20 (by weight) Xylene/Dibasic Ester/Butyl Cellosolve, 13.634% Unitika Elitel UE-9800 polyester resin dissolved at 26.5% in 40/30/30 (by weight) Dibasic Ester/Xylene/Aromatic 100, 7.607% Cymel 5010 benzoguanamine, 0.777% Santolink EP-560 phenolic, 0.342% CYCAT 600 acid catalyst dissolved at 10% in Isopropyl Alcohol, 1.014% Lanco Glidd LG 4832 polyethylene wax solution and 0.525% Slip-Ayd SL-506 carnauba wax solution.

Samples B through I are clear beverage end linings prepared as described for Sample A with polyesters Example 1—Runs 1 through 8 thinned to 28.4% with 60/40 (by weight) Dibasic Ester/Xylene replacing Vylon GK-330 and the polyester of Example 3 thinned to 27.6% with 60/40 (by weight) Dibasic Ester/Xylene replacing Unitika UE-9800. (Sample B utilized polyester Example 1—Run 1; Sample C utilized polyester Example 1—Run 2; Sample D utilized polyester example 1—Run 3; Sample E utilized polyester example 1—Run 4; Sample F utilized polyester Example 1—Run 5; Sample G utilized polyester Example 1—Run 6; Sample H utilized polyester Example 1—Run 7; Sample I utilized polyester Example 1—Run 8.)

Sample J is a clear beverage end lining prepared with the following composition: 57.700% polyester of Example 1—Run 10 thinned to 28.4% with 60/40 (by weight) Dibasic Ester/Xylene, 32.035% polyester of Example 3 thinned to 27.6% with 60/40 (by weight) Dibasic Ester/Xylene, 7.607% Cymel 5010 benzoguanamine, 0.777% Santolink EP-560 phenolic, 0.342% CYCAT 600 acid catalyst dissolved at 10% in Isopropyl Alcohol, 1.014% Lanco Glidd LG 4832 polyethylene wax solution and 0.525% Slip-Ayd SL-506 carnauba wax solution.

Sample K is a clear beverage end lining prepared as described for Sample J with Cymel 325 melamine replacing the Cymel 5010 benzoguanamine.

Example 9

Testing of Various Coating Compositions

Coatings were applied over chemically cleaned and commercially chrome-treated aluminum panels using a wire-wound applicator rod to obtain a dried film thickness of approximately 7.5 mgs/in$^2$. Coated panels were cured for 14 seconds to 249° C. peak metal temperature (PMT) in a gas-fired high air velocity coil oven. Panels were air-cooled.

TABLE 1

| Film Properties (Samples A-I) | | | | | | | | | |
|---|---|---|---|---|---|---|---|---|---|
| | A | B | C | D | E | F | G | H | I |
| MEK Double Rubs | >100 | 11 | 30 | 45 | 12 | 4 | 40 | 17 | 17 |
| Reverse Impact Crazing | None | None | None | None | None | None | None | None | None |
| Water Pasteurization (45 minutes at 85° C.) | | | | | | | | | |
| Blush | 10 | 10 | 10 | 10 | 10 | 10 | 10 | 10 | 10 |
| Adhesion | 10 | 10 | 10 | 10 | 10 | 10 | 10 | 10 | 10 |
| Water Retort (90 minutes at 121° C.) | | | | | | | | | |
| Blush | 9 | 10 | 9 | 10 | 10 | 5 | 10 | 9 | 5 |
| Adhesion | 10 | 10 | 10 | 10 | 10 | 10 | 10 | 10 | 10 |
| 1T Bend (milliamps) | 0.4 | 0.2 | 0.5 | 0.2 | 0.1 | 12.0 | 0.0 | 0.0 | 3.0 |
| Feathering (mm) | 0.8 | 0.1 | 0.1 | 0.3 | 0.1 | 0.2 | 0.1 | 0.9 | 0.1 |

TABLE 2

| Film Properties (Samples J and K) | | | |
|---|---|---|---|
| | A (retest) | J | K |
| MEK Double Rubs | 35 | 9 | 75 |
| Reverse Impact Crazing | None | None | None |
| Water Pasteurization (45 minutes at 85° C.) | | | |
| Blush | 10 | 10 | 10 |
| Adhesion | 10 | 10 | 10 |
| Water Retort (90 minutes at 121° C.) | | | |
| Blush | 9/10 | 9/10 | 10/10 |
| Adhesion | 10/10 | 10/10 | 10/10 |
| 1T Bend (milliamps) | 0.1 | 0.0 | 0.8 |
| Feathering (mm) | 0.2 | 0.6 | 0.6 |
| Beverage End Fabrication | | | |
| Metal Exposures (ma) | 0.1 | 0.4 | 0.5 |
| CuCl Corrosion | Moderate-Severe | Slight | Very Slight |

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. An article, comprising an aluminum beverage can end coated on an interior surface with a coating obtained from a coating composition comprising:
   between about 60 and 95 weight percent of one or more polyester resins, based on solids content of the coating composition, wherein between about 50 and 100 weight percent of the one or more polyester resins are low Tg polyesters having a glass transition temperature of less than 50° C.; and
   a crosslinker comprising a benzoguanamine-formaldehyde resin;
   wherein the coating composition is substantially free of mobile BPA and aromatic glycidyl ether compounds.

2. The article of claim 1, wherein the one or more low Tg polyesters have a Tg of greater than 10° C.

3. The article of claim 1, wherein the coating composition includes one or more acrylate copolymers having pendant glycidyl groups.

4. The article of claim 1, wherein the one or more low Tg polyesters are formed by the reaction of one or more polyols and a mixture of polyacids comprising sebacic acid, terephthalic acid, and isophthalic acid.

5. The article of claim 1, wherein the coating composition includes between 65 and 85 weight percent of the one or more polyester resins, based on solids content of the coating composition.

6. The article of claim 1, wherein the coating composition is substantially free of bound BPA and aromatic glycidyl ether compounds.

7. The article of claim 1, wherein the beverage can end passes less than 5 milliamps of current while being exposed for 4 seconds to an electrolyte solution containing 1% by weight of NaCl dissolved in deionized water.

8. The article of claim 1, wherein the beverage can end passes less than 1 milliamps of current while being exposed for 4 seconds to an electrolyte solution containing 1% by weight of NaCl dissolved in deionized water.

9. The article of claim 1, wherein the coating composition is 20 to 40% solids and includes from between 10 to 20% by weight of crosslinker, based upon the total weight of resin solids in the coating composition.

10. The article of claim 1, wherein the benzoguanamine-formaldehyde resin is a fully alkylated benzoguanamine-formaldehyde resin.

11. The article of claim 1, wherein the one or more polyesters have a hydroxyl number of less than 20 and an acid number below 5.

12. The article of claim 1, wherein the one or more low Tg polyesters have a glass transition temperature of less than 45° C.

13. The article of claim 12, wherein the one or more low Tg polyesters have a Tg of greater than 10° C.

14. The article of claim 1, wherein the one or more low Tg polyesters have a glass transition temperature of less than 40° C.

15. The article of claim 14, wherein the one or more low Tg polyesters have a Tg of greater than 10° C.

16. The article of claim 1, wherein the one or more low Tg polyesters are formed by the reaction of one or more polyacids and one or more polyols, wherein the one or more polyacids include sebacic acid.

17. The article of claim 16, wherein the one or more polyols are substantially free of NPG.

18. The article of claim 1, wherein the coating composition includes a lubricant.

19. The article of claim 18, wherein the lubricant is present in the coating composition in an amount of about 0.1 to about 2%, by weight of nonvolatile material.

20. The article of claim 18, wherein the lubricant comprises a Carnauba wax or a polyethylene type lubricant.

* * * * *